United States Patent [19]
Shrader

[11] 3,716,762
[45] Feb. 13, 1973

[54] METER POWER DISTRIBUTION APPARATUS FOR MOBILE HOMES WITH A DETACHABLE FRONT PANEL FOR POWER OUTLET FITTINGS

[76] Inventor: Delworth Shrader, 5088 Nerissa Way, San Jose, Calif. 95124

[22] Filed: Aug. 6, 1971

[21] Appl. No.: 169,643

[52] U.S. Cl. ............................317/107, 317/108, 174/38
[51] Int. Cl. ..........................................................H02b 9/00
[58] Field of Search ......312/100; 317/104, 105, 107, 317/109–111, 120; 174/38, 45 R, 60

[56] References Cited

UNITED STATES PATENTS

| | | | |
|---|---|---|---|
| 3,585,456 | 6/1971 | Phillips | 317/120 |
| 2,958,810 | 11/1960 | Balf | 317/107 |
| 3,183,408 | 5/1965 | Keller | 317/104 |

FOREIGN PATENTS OR APPLICATIONS

| | | | |
|---|---|---|---|
| 391,825 | 5/1965 | Switzerland | 174/38 |

*Primary Examiner*—Robert K. Schaefer
*Assistant Examiner*—Gerald P. Tolin
*Attorney*—Jack M. Wiseman

[57] ABSTRACT

A meter power distribution apparatus in which anchor clips are connected to the meter line side of the watt-hour meter and anchor clips are connected to the load line side of the watt-hour meter.

11 Claims, 5 Drawing Figures

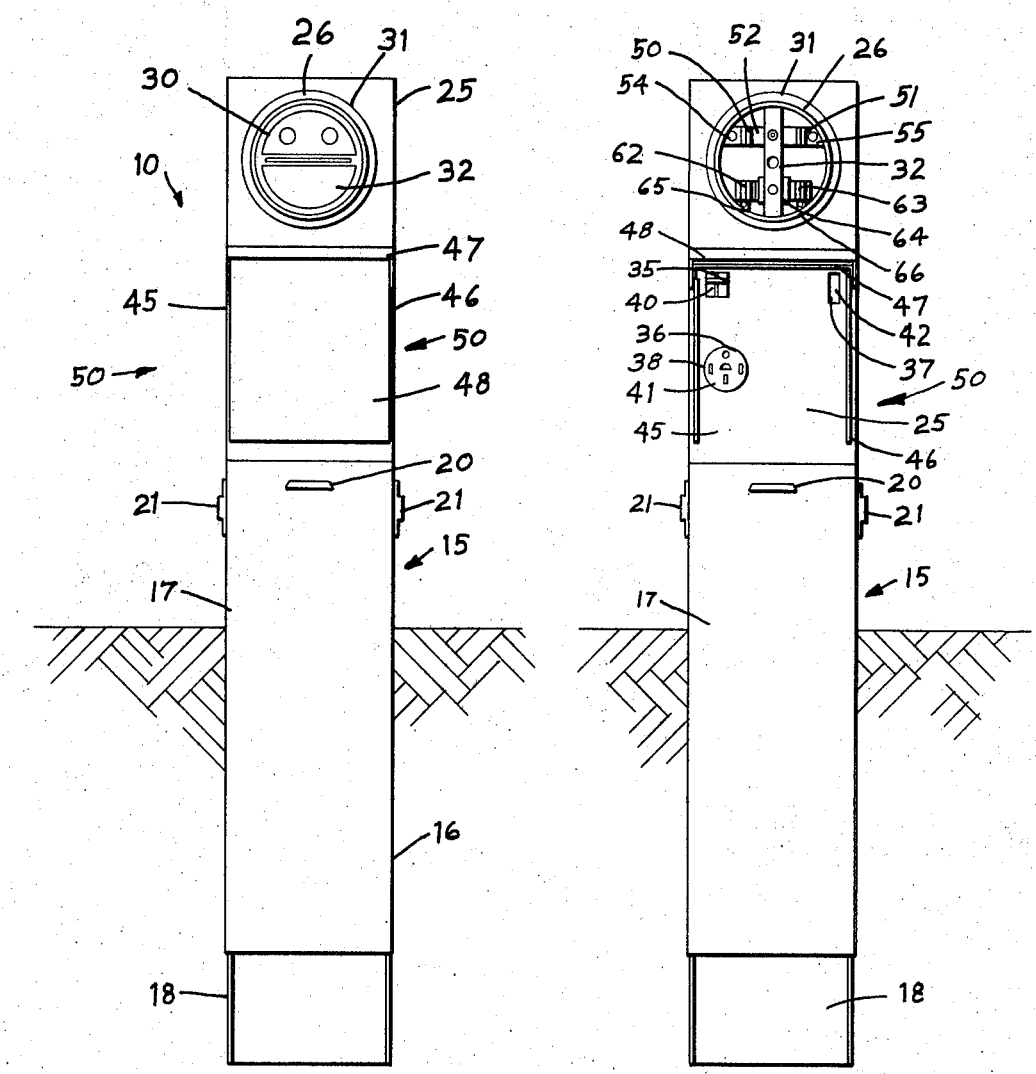
FIG_1   FIG_2
INVENTOR.
DELWORTH SHRADER
ATTORNEY

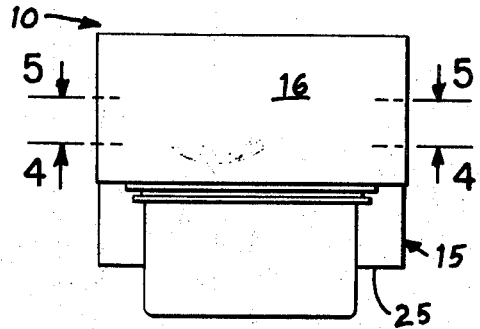
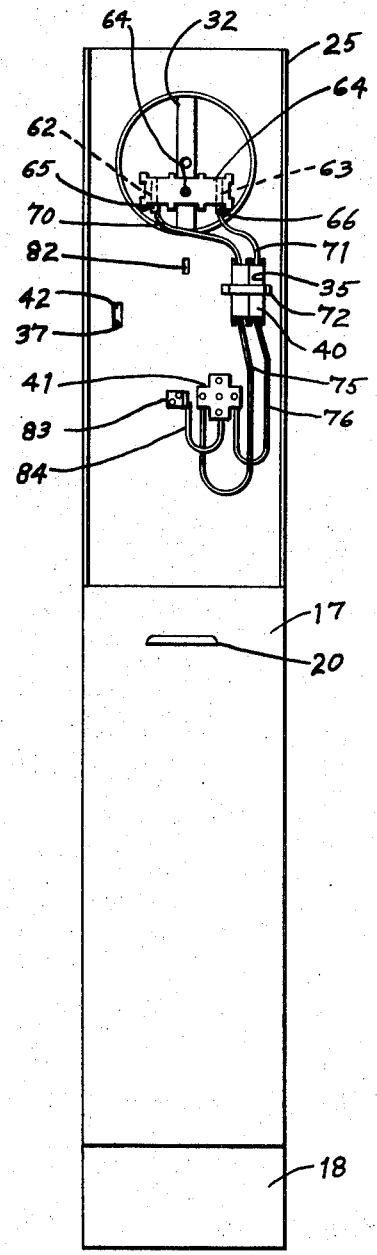
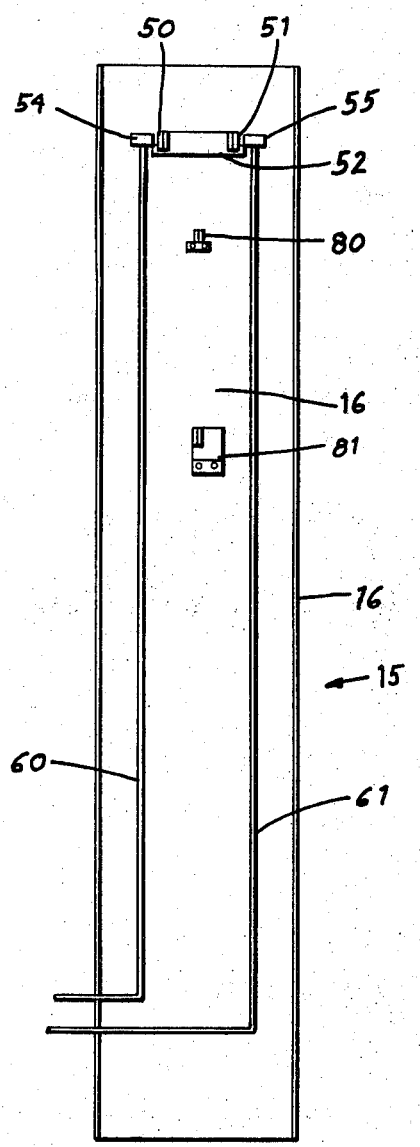

METER POWER DISTRIBUTION APPARATUS FOR MOBILE HOMES WITH A DETACHABLE FRONT PANEL FOR POWER OUTLET FITTINGS

BACKGROUND OF THE INVENTION

Power distribution pedestals for mobile homes receive power from an underground electrical system and provide outlets through which power is distributed to the lighting systems, heating systems, applicances and the like in mobile homes. These units are installed in the ground and extend upwardly therefrom. Electrical service conductors over which power is supplied are underground and are received by the pedestal for connection to a line bus bar system. The line bus bar system extends above the ground level and is connected to the line side of a watt-hour meter. In addition to its connection to the line side of the watt-hour meter, the line bus bar system, which is at a high potential. Connected to the load bus bar system are various power outlets mounted on a detachable front panel for establishing electrical connections with lighting systems, appliances and the like.

Such pedestals are provided with various detachable front panels that are selected in accordance with the power outlets required to satisfy the needs of the mobile home owner and services to be performed. Consequently, the front panels are removed from and connected to the load bus bar system which is at a high potential. This action creates an element of danger to the exposure of shock in removing or connecting front panels to the load bus bar system. Such pedestals have to be disassembled to install and the line terminals thereof are close to the ground and are rather inaccessible.

U.S. Pats. of interest are:
No. 3,361,938
No. 2,603,546
No. 2,457,347
No. 3,341,268

SUMMARY OF THE INVENTION

A meter power distribution apparatus in which input power conductors are connected to the line side of a watt-hour meter by means of spaced connectors and the load side of the watt-hour meter is connected directly to power distribution outlets of a front panel by means of spaced connectors, which last mentioned spaced connectors are separate and apart from the first mentioned space connectors.

By virtue of the present invention, the need for the line bus bar systems and the load bus bar system has been obviated. The danger of electrical shock when replacing front panels with power outlets has been reduced. The pedestals are no longer required to be disassembled for installation and the line power terminals can be located above the ground to facilitate the connecting of line conductors thereto.

DESCRIPTION OF THE DRAWINGS

FIG. 1 is a front elevation view of the meter power distribution apparatus embodying the present invention.

FIG. 2 is a front elevation view of the meter power distributing apparatus shown in FIG. 1 with the watt-hour meter thereof removed and with the front panel cover thereo in a raised position.

FIG. 3 is a top view of the apparatus shown in FIG. 1.

FIG. 4 is a vertical sectional view of the meter power distributing apparatus shown in FIG. 1 taken along line 4—4 of FIG. 3.

FIG. 5 is a vertical sectional view of the meter power distributing apparatus shown in FIG. 1 taken along line 5—5 of FIG. 3.

DESCRIPTION OF THE PREFERRED EMBODIMENT

Illustrated in FIG. 1 is the meter power distributing apparatus 10 of the present invention which may be in the form of a meter pedestal or may be in the form of a meter switch box mounted on a pole or the like. For purposes of convenience, the meter pedestal is described in detail herein, although the inventive concepts are equally applicable to the meter switch box.

The meter power distributing apparatus 10 comprises a panel housing 15, which housing includes an upright channel member 16. Attached to the channel member 16 by screws or the like is a lower enclosure member 17. A suitable opening 18 is formed in the lower enclosure member 17 for receiving line or service conductors from suitable underground electric system for the distribution of electrical power. At the upper portion of the enclosure member 17 is a suitable air vent 20. Television and telephone brackets 21 are mounted on the sides of the channel member 16. Generally, the lower portion of the channel member 16 and the lower portion of the lower enclosure member 17 are installed in the ground with the grade level as shown in FIGS. 1 and 2.

An upper enclosure member or front panel 25 is attached to the upper end of the channel member 16 to enclose entirely the upper portion of the housing 15. The front panel 25 extends to a position contiguous with the lower enclosure member 17. Formed in the upper enclosure member 25 is a cylindrical opening 26 and received by the cylindrical opening 26 is a cylindrical plate 31. The cylindrical plate 31 is mounted on the upper enclosure member 25 and forms a socket in which is seated a conventional watt-hour meter 30 (FIG. 1). Extending diametrically across the cylindrical plate 31 and connected thereto by screws or the like is a mounting bar 32 (FIGS. 2 and 5).

Formed in the front panel 25 below the opening 26 for the meter 30 are suitable openings 35–37 (FIG. 2) for mounting a circuit breaker 40, an electrical plug 41 and an outlet receptacle 42, respectively. Projecting outwardly from the front panel 25 with the openings 35–37 therebetween are upright side walls 45 and 46, which are interconnected by a top wall 47. The top wall 47 supports a cover 48 for pivotal movement. Thus, the side walls 45 and 46, the top wall 47 and the cover 48 (FIG. 1) form a switch enclosure 50 to protect the plug, switch and circuit breaker from tampering and the elements when the cover 48 is in the down position and provide access to the plug, switch and circuit breaker when the cover 48 (FIG. 2) is in the raised position.

Should it be desired to vary the front power outlet fittings for different services, then the front panel 25 can be detached from the channel member 16 and replaced with another front panel 25 that provides the desired front power outlets.

Mounted on the inside wall of the chamber member 16 opposite the cylindrical plate 31 are meter anchor clips 50 and 51 (FIGS. 2 and 4). Toward this end, a suitable insulator 52 (FIG. 4), such as a waxed phenolic insulator, is fixed to the inside wall of the channel member 16 by suitable means, such as screws. Projecting from the insulator 52 toward the opening 26 and fixed to the insulator by suitable means are the meter anchor clips 50 and 51. The line meter anchor clips 50 and 51 are made of metal and are suitable conductors of electricity. Also mounted on the insulator 52 in fixed relation thereto are line lugs or terminals 54 and 55. The lug or terminal 54 is electrically connected to the line meter clip 50 by means of a suitable conductor strip. Similarly, the lug or terminal 55 is electrically connected to the line meter clip 51 by means of a suitable conductor strip. Suitable insulating sheets are disposed above and below the meter clips 50-51 and the lugs 54-55.

A pair of power supply service entrance conductors 60 and 61 (FIG. 4) are extended from the underground above the ground level and electrically connected to them are terminals 54 and 55, respectively, to supply power from a suitable source of power to the line side of the meter 30.

Below the line meter clips 50 and 51 are disposed load anchor meter clips 62 and 63 (FIGS. 2 and 5), which are mounted on the bar 32 by a suitable insulator 64, such as a waxed phenolic insulator. More specifically, the insulator 64 is fixed to the bar 32 by screws or the like. Fixed to the insulator 64 by screws or the like are the load anchor clips 62 and 63. Also fixed to the insulator 64 are a pair of load lugs or terminals 65 and 66 (FIG. 5). A vertical plane passing through the bar 32 would lie between the clips 50 and 51, between the lugs 54 and 55, between the clips 62 and 63 and between the lugs 65 and 66. The meter 30 is placed in the socket formed by the cylindrical plate 31 and urged toward the channel plate 16 until the load terminals of the meter 30 are seated within the clips 50 and 51, respectively, to establish electrical connections therewith and the line terminals of the meter 30 are seated within the clips 62 and 63, respectively, to establish electrical connections therewith. Thus, the meter 30 is supported by the plate 31, the clips 50-51, and the clips 62 and 63. The meter 30 is a conventional meter and establishes therethrough electrical connections between the line clips 50 and 51 and the load clips 62 and 63.

Load conductors 70-71 (FIG. 5) are electrically connected to the input side of the circuit breaker 40. A suitable bracket 72 attached to the front panel 17 retains the circuit breaker 40 in fixed relation to the front panel 17. As is well-known in the art, the circuit breaker 40 includes a switch for making and breaking a circuit, whereby the power to be distributed through the circuit breaker can be turned or or off.

The load side of the circuit breaker 40 is connected to the outlet receptacle 41 over suitable conductors 75 and 76. A sheet insulator extends behind the receptacle 51. Ground clips 80 and 81 (FIG. 4) are mounted on the channel 16. Aligned therewith are ground prongs 82 and 83, respectively, (FIG. 5). Conductor 84 connects the ground prong 83 to the outlet receptacle 41.

I claim:

1. A meter power distribution apparatus comprising:
a. a housing with a front panel and a rear panel, said front panel being detachable;
b. a first and second line anchor clip in said housing for establishing an electrical connection with an incoming utility power line;
c. means mounting said line anchor clips on said rear panel;
d. a first and a second load anchor clip in said housing for establishing an electrical connection with load power outlets;
e. means mounting said load anchor clips on said front panel;
f. a watt-hour meter with line terminals in engagement with said first and second line anchor clips and with load terminals in engagement with said first and second load anchor clips supported thereby; and
g. power outlet fittings mounted on said front panel.

2. A meter power distribution apparatus as claimed in claim 1 and comprising a circuit breaker disposed in said housing and mounted on said front panel, and load wire interconnecting said load anchor clips to said circuit breaker.

3. A meter power distribution apparatus as claimed in claim 2 wherein said power outlet fittings include a load outlet receptacle disposed in said housing and mounted on said front panel, and conductors interconnecting said receptacle with said circuit breaker.

4. A meter power distribution apparatus as claimed in claim 3 wherein said front panel includes an opening through which the front portion of said meter is received, said meter being attached to said line clips and said load clips to be supported thereby.

5. A meter power distribution apparatus as claimed in claim 4 and comprising a member disposed diametrically across said opening, and a first insulator fixed to said diametrically disposed member, said first and second load anchor clips being mounted on said first insulator.

6. A meter power distribution apparatus as claimed in claim 5 wherein said first meter line clip is disposed adjacent one side of said diametrically disposed member, said second meter line clip is disposed adjacent the other side of said diametrically disposed member, said first meter load clip is disposed adjacent said one side of said diametrically disposed member spaced from said first meter line clip and said second meter load clip is disposed adjacent said other side of said diametrically disposed member spaced from said second meter line clip.

7. A meter power distribution apparatus as claimed in claim 6 and comprising a second insulator fixed to said rear panel, said first and second meter line clips being mounted on said second insulator.

8. A meter power distribution apparatus as claimed in claim 7 wherein said front panel is segmented, and the segment of said front panel in which said receptacle is mounted is detachably secured.

9. A meter power distribution apparatus as claimed in claim 8 and comprising enclosure means mounted on said front panel in overlying relation to said receptacle and said circuit breaker.

10. A meter power distribution system as claimed in claim 9 wherein said enclosure means comprises a pivotally mounted cover.

11. A meter power distribution system as claimed in claim 10 wherein the bottom segment of said front panel is installed in the ground with the confronting portion of the rear panel, and underground service lines are connected to said first and second line clips.

* * * * *